(12) United States Patent
Aske et al.

(10) Patent No.: US 9,994,299 B2
(45) Date of Patent: Jun. 12, 2018

(54) TOOL AND METHOD OF INSTALLING A BULKHEAD WITHIN A STRUCTURE

(71) Applicant: THE BOEING COMPANY, Huntington Beach, CA (US)

(72) Inventors: James Alan Aske, Hanahan, SC (US); Andrew J. Ponton, Summerville, SC (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 14/678,518

(22) Filed: Apr. 3, 2015

(65) Prior Publication Data

US 2016/0288896 A1 Oct. 6, 2016

(51) Int. Cl.
*B25B 3/00* (2006.01)
*B64C 1/10* (2006.01)
*B64F 5/00* (2017.01)

(52) U.S. Cl.
CPC . *B64C 1/10* (2013.01); *B64F 5/00* (2013.01)

(58) Field of Classification Search
CPC .... B25B 1/00; B25B 5/00; B25B 3/00; B23Q 19/00
See application file for complete search history.

(56) References Cited

U.S. PATENT DOCUMENTS

| | | | | |
|---|---|---|---|---|
| 4,418,901 A * | 12/1983 | Woods | | B25B 1/22 269/101 |
| 5,060,920 A * | 10/1991 | Engibarov | | B25B 1/241 269/282 |
| 6,126,158 A * | 10/2000 | Engibarov | | B25B 5/08 269/101 |
| 6,158,728 A * | 12/2000 | Smith | | B25B 5/006 269/88 |
| 6,575,444 B1 * | 6/2003 | Bidaud | | B23K 37/0443 269/152 |
| 7,815,177 B2 * | 10/2010 | Holliger | | B23P 19/041 269/303 |
| 2011/0179626 A1 | 7/2011 | Weber et al. | | |
| 2012/0186062 A1 | 7/2012 | Vera Villares et al. | | |
| 2012/0228427 A1 | 9/2012 | Sayilgan et al. | | |
| 2016/0288896 A1 * | 10/2016 | Aske | | B64C 1/10 |

* cited by examiner

*Primary Examiner* — Lee D Wilson
(74) *Attorney, Agent, or Firm* — Armstrong Teasdale LLP

(57) ABSTRACT

A tool for use in installing a bulkhead within a structure is provided. The tool includes a base member configured to couple to the structure, and a positioning member configured to couple to the bulkhead. The base member includes a primary fastener hole sized to receive at least a portion of a fastener therethrough, and sized such that the fastener is configured to bias against the base member to retract the positioning member towards the base member when the fastener is engaged with the positioning member.

20 Claims, 6 Drawing Sheets

TOOL AND METHOD OF INSTALLING A BULKHEAD WITHIN A STRUCTURE

BACKGROUND

The field of the present disclosure relates generally to aircraft manufacturing and, more specifically, to systems and methods of installing a bulkhead within a fuselage.

At least some known aircraft components may be fabricated from multi-layer laminate structures of non-metallic composite materials such as carbon-fiber-reinforced polymer (CFRP). Composite materials generally have a high strength-to-weight ratio and may be formed in a variety of shapes and sizes. To reduce the weight of an aircraft, the composite materials may be used in combination with metallic materials, such as aluminum, titanium, and/or steel. Reducing overall weight generally contributes to increasing the fuel efficiency of the aircraft.

At least some known aircraft include bulkheads fabricated at least partially from composite materials. Installation of a bulkhead within a barrel section of a fuselage, for example, generally includes positioning the bulkhead within the barrel section with an interference fit. More specifically, the bulkhead is forced into position within the barrel section with one or more tools from outside of the barrel section. Moreover, in one known process, at least one pair of fastener holes defined in the bulkhead and the barrel section facilitate determining a final installation position of the bulkhead within the barrel section when the pair of fastener holes is aligned. However, bulkheads fabricated from composite materials are generally flexible, thereby limiting the effectiveness of forcing the bulkhead into the final installation position even when a large amount of pressure is applied, and causing difficulties in aligning the pair of fastener holes. Moreover, alignment of the pair of fastener holes is further complicated by the relatively large size of bulkhead.

BRIEF DESCRIPTION

In one aspect, a tool for use in installing a bulkhead within a structure is provided. The tool includes a base member configured to couple to the structure, and a positioning member configured to couple to the bulkhead. The base member includes a primary fastener hole sized to receive at least a portion of a fastener therethrough, and sized such that the fastener is configured to bias against the base member to retract the positioning member towards the base member when the fastener is engaged with the positioning member.

In another aspect, a system for use in installing a bulkhead within a barrel section of an aircraft is provided. The system includes a plurality of tools positioned circumferentially about the barrel section of the aircraft. Each tool includes a base member coupled to the barrel section of the aircraft, a positioning member coupled to the bulkhead, and a fastener extending from the base member to selectively engage the positioning member. The fastener is configured to bias against the base member to retract the positioning member towards the base member.

In yet another aspect, a method of installing a bulkhead within a structure is provided. The method includes positioning the bulkhead in a first installation position within the structure, coupling a base member of a tool to the structure, coupling a positioning member of the tool to the bulkhead, extending a fastener from the base member to engage the positioning member, and retracting the positioning member towards the base member such that the bulkhead is in a second installation position within the structure.

DETAILED DESCRIPTION

The implementations described herein relate to systems and methods of installing a bulkhead within a structure, such as a barrel section of an aircraft. The systems include one or more tools that are coupled between the bulkhead and the barrel section, and that are positioned circumferentially about an interior of the barrel section. The tools provide a localized pulling force against the bulkhead to facilitate positioning the bulkhead in a final installation position relative to the barrel section. Fastener holes can then be formed in the bulkhead and the barrel section as the tools hold the bulkhead in the final installation position. As such, the systems and methods described herein facilitate installing the bulkhead within the barrel section in a more efficient manner.

Figure 1:
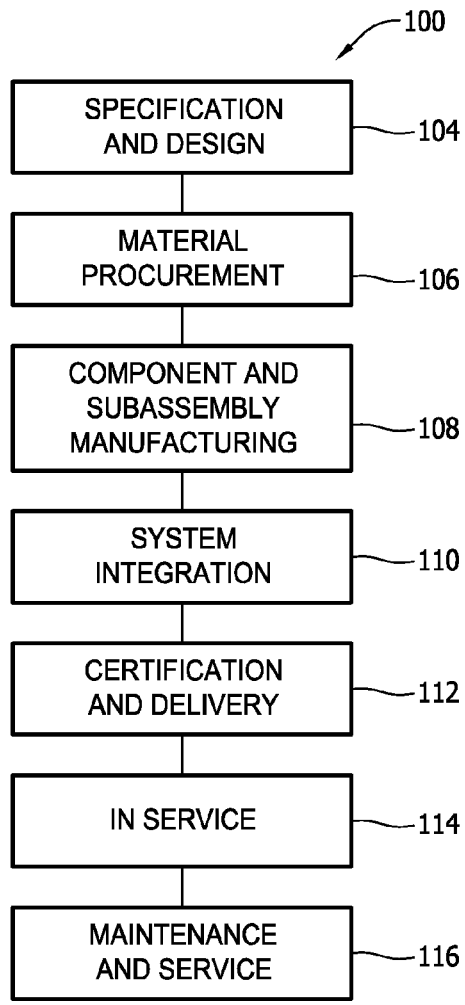
FIG. 1 is a flow diagram of an exemplary aircraft production and service method.
Figure 2:
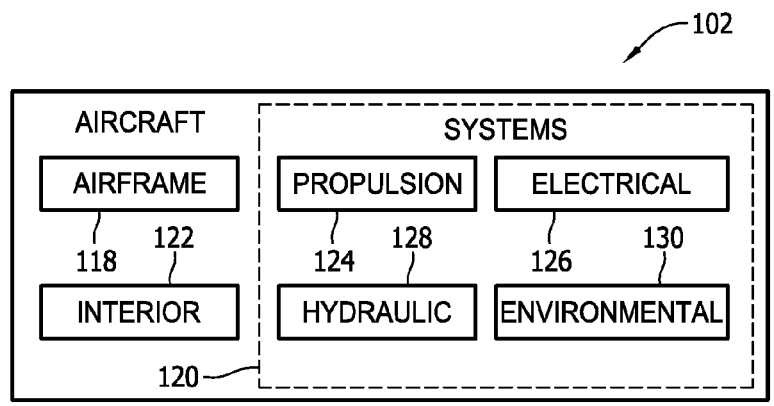
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
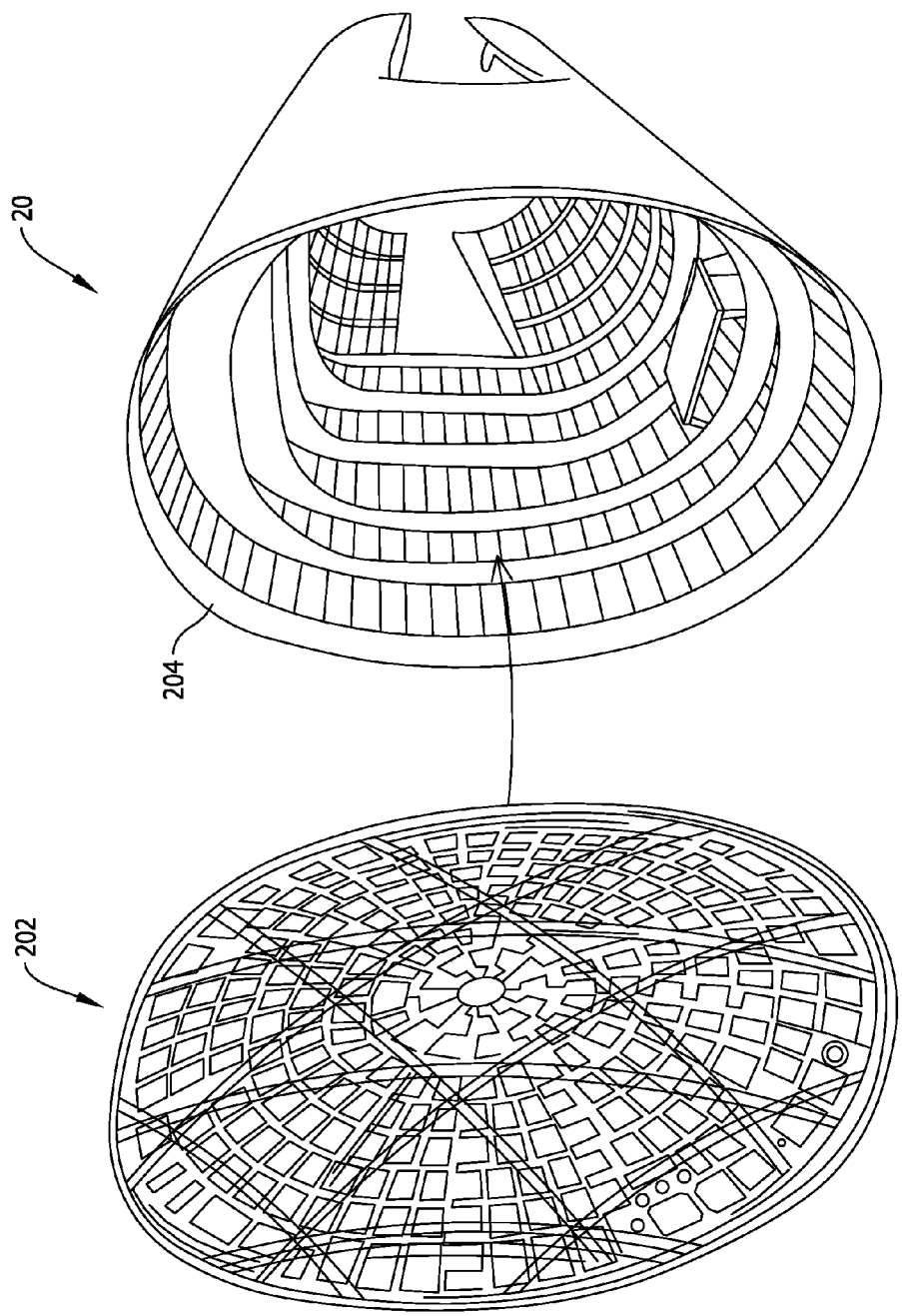
FIG. 3 is a perspective view of a portion of an exemplary aircraft.

FIG. 3 is a perspective view of a portion of an exemplary aircraft 102. In the exemplary implementation, aircraft 102 is formed from a structure, such as a barrel section 200 of a fuselage (not shown). Aircraft 102 also includes a bulkhead 202 for installation within an interior 204 of barrel section 200. More specifically, interior 204 of barrel section 200 and an outer periphery of bulkhead 202 have substantially similar profiles such that bulkhead 202 couples to barrel section 200 with an interference fit when installed therein. Moreover, while described in the context of an aircraft, it should be understood that the tool described herein can be used to install bulkheads within other structures or vehicles, such as marine vessels and railroad cars, for example.

Figure 4:
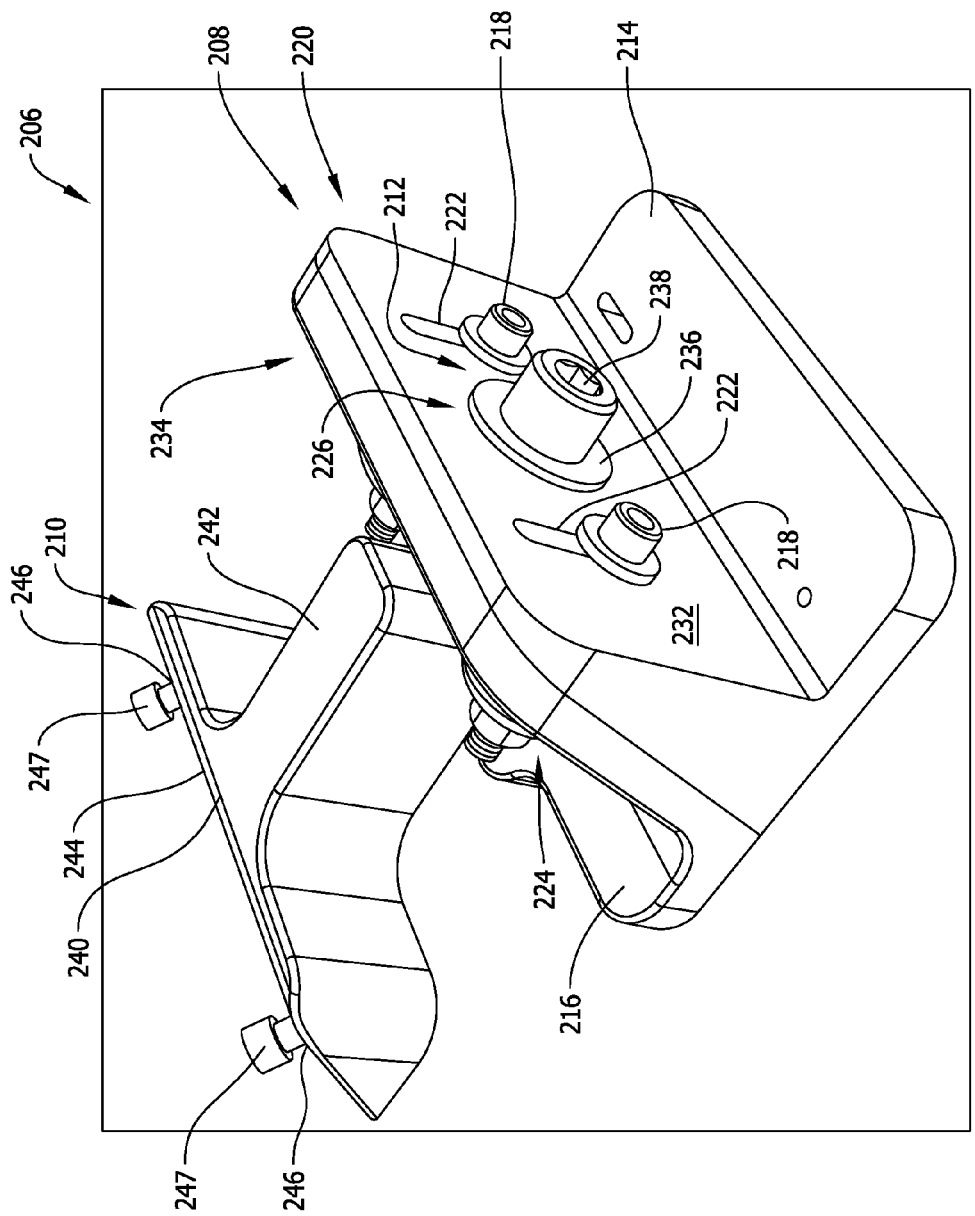
FIG. 4 is a perspective view of an exemplary tool that may be used to install the bulkhead within the barrel section shown in FIG. 3.
Figure 5:
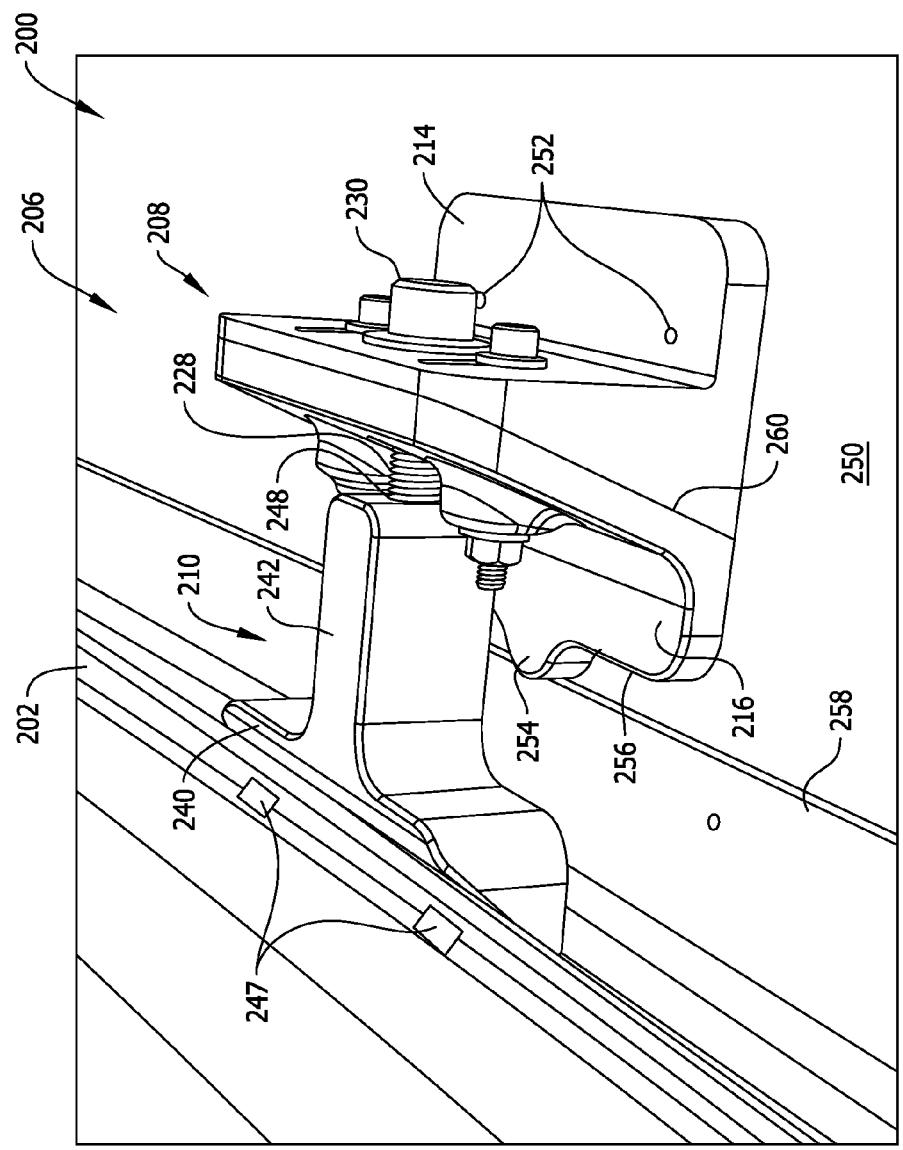
FIG. 5 is a partially transparent perspective view of the tool shown in FIG. 4 coupled to the bulkhead and the barrel section shown in FIG. 3.

FIG. 4 is a perspective view of an exemplary tool 206 that may be used to install bulkhead 202 within barrel section 200 (each shown in FIG. 3), and FIG. 5 is a partially transparent perspective view of tool 206 coupled to bulkhead 202 and barrel section 200. By partially transparent, it should be understood that a portion of bulkhead 202 has been removed for the sake of clarity. In the exemplary implementation, tool 206 includes a base member 208 and a positioning member 210. A fastener extends from base member 208 to selectively engage positioning member 210. As will be described in more detail below, fastener 212 is configured to bias against base member 208 to retract positioning member 210 towards base member 208.

Base member 208 includes a stationary portion 214 and a moveable portion 216 coupled to stationary portion 214 with at least one secondary fastener 218. More specifically, base member 208 includes a flange portion 220 formed from at least a portion of stationary portion 214 and at least a portion of moveable portion 216. Flange portion 220 extends in a substantially normal direction from a remainder of base member 208. Moreover, stationary portion 214 includes a fastener slot 222, and moveable portion 216 includes a secondary fastener hole 224. Fastener slot 222 and fastener hole 224 are each defined in flange portion 220 and sized to receive secondary fastener 218 therethrough. Fastener slot 222 has an elongated shape such that, when loosened, secondary fastener 218 is selectively translatable therein. As such, as will be described in more detail below, secondary fastener 218 loosens to enable moveable portion 216 to selectively translate relative to stationary portion 214 along an interface 260 defined therebetween without being uncoupled from stationary portion 214.

Base member 208 also includes a primary fastener hole 226 defined in flange portion 220, through each of stationary portion 214 and moveable portion 216. Primary fastener hole 226 is sized to receive at least a portion of fastener 212 therethrough. More specifically, in one implementation, fastener 212 includes a threaded portion 228 and a head portion 230 coupled to threaded portion 228. Threaded portion 228 is sized to extend through primary fastener hole 226 from a first side 232 to a second side 234 of flange portion 220, and head portion 230 is sized such that head portion 230 can bias against first side 232 of flange portion 220. For example, in one implementation, head portion 230 has a greater diameter than primary fastener hole 226 such that head portion 230 biases directly against stationary portion 214. Alternatively, a washer 236 is positioned between stationary portion 214 and head portion 230 about primary fastener hole 226, and head portion 230 biases against washer 236, which biases against stationary portion 214. Moreover, head portion 230 includes a recess 238 shaped for engagement with a motorized tool, such as a torque-limited electric drill. Alternatively, threaded portion 228 and head portion 230 may be any suitable device that enables tool 206 to function as described herein.

In the exemplary implementation, positioning member 210 includes a lateral portion 240 and an elongated portion 242 extending from lateral portion 240. Lateral portion 240 extends in a substantially transverse direction relative to elongated portion 242 to facilitate improving loading when coupled to bulkhead 202. Lateral portion 240 also includes a mounting face 244 having a pair of fastener holes 246 defined therein. Fastener holes 246 facilitate coupling positioning member 210 to bulkhead 202 (shown in FIG. 3), as will be described in more detail below. Moreover, mounting face 244 has a contoured profile to facilitate substantially flush engagement between positioning member 210 and bulkhead 202.

Elongated portion 242 has a width that enables it to fully retract between secondary fasteners 218 when engaged with threaded portion 228 of fastener 212. Moreover, elongated portion 242 includes a screw hole 248 defined therein. Fastener 212 threadably engages screw hole 248 such that a distance that positioning member 210 retracts towards base member 208 is based on a distance that fastener 212 is inserted within screw hole 248. As such, the retraction of positioning member 210 is limited by at least one of a depth of screw hole 248 or by contact between elongated portion 242 and base member 208.

Referring to FIG. 5, base member 208 is coupled to the structure, such as an interior surface 250 of barrel section 200, and positioning member 210 is coupled to bulkhead 202 with a pair of fasteners 247. More specifically, fasteners 247 extend through bulkhead 202 for insertion within fastener holes 246 of positioning member 210. Moreover, stationary portion 214 is coupled to the structure, and includes a pair of temporary fastener holes 252 defined therein. Temporary fastener holes 252 are sized to receive temporary fasteners (not shown) therethrough for coupling to barrel section 200. As such, base member 208 is temporarily coupled to barrel section 200 during installation of bulkhead 202 within barrel section 200, for example.

Moveable portion 216 of base member 208 also includes a stopper portion 254 oriented to extend towards bulkhead 202 when base member 208 is coupled to barrel section 200. Stopper portion 254 extends a distance from an edge 256 of moveable portion 216 that enables a final installation position of bulkhead 202 relative to barrel section 200 to be determined. As such, as will be described in more detail below, stopper portion 254 determines the final installation position of bulkhead 202 when a rim edge 258 of bulkhead 202 presses against stopper portion 254.

In one implementation, moveable portion 216 is coupled to stationary portion 214 at interface 260 that has an angled orientation relative to interior surface 250 of barrel section 200. More specifically, interface 260 has an angle relative to interior surface 250 that enables moveable portion 216 to be uncoupled from interior surface 250 as moveable portion 216 selectively translates relative to stationary portion 214. For example, rim edge 258 of bulkhead 202 induces a pressure on stopper portion 254 when bulkhead 202 is in the final installation position. As such, interface 260 has an angle relative to interior surface 250 that enables moveable portion 216 to translate away from rim edge 258.

In some implementations, a system for use in installing bulkhead 202 within barrel section 200 includes a plurality of tools 206 positioned circumferentially about barrel section 200 of aircraft 102. More specifically, tools 206 are spaced at regular and/or irregular intervals about barrel section 200, and are operable either alone or in combination to retract bulkhead 202 relative to barrel section 200.

Figure 6:
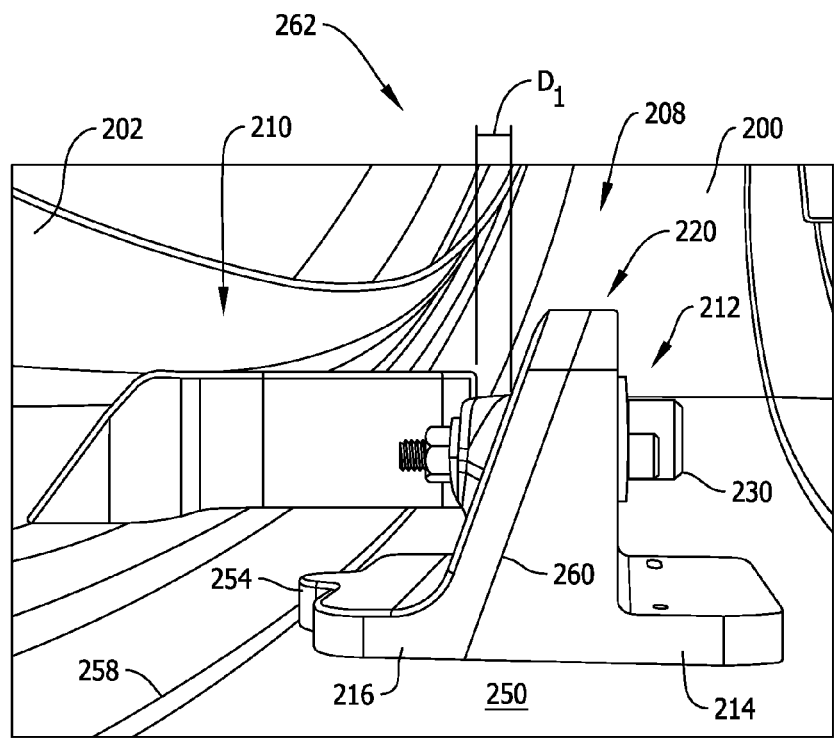
FIG. 6 is a partially transparent partially transparent side view of the tool shown in FIG. 5 with the bulkhead in a first installation position.
Figure 7:
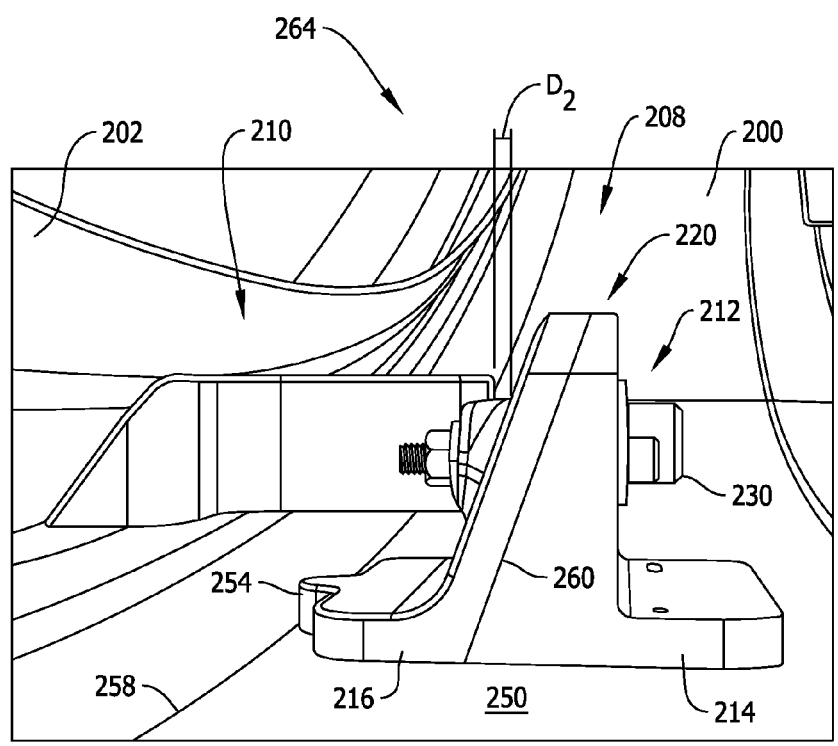
FIG. 7 is a partially transparent side view of the tool shown in FIG. 5 with the bulkhead in a second installation position.

FIG. 6 is a partially transparent side view of tool 206 with bulkhead in a first installation position 262, and FIG. 7 is a partially transparent side view of tool 206 with bulkhead 202 in a second installation position 264. In the exemplary implementation, base member 208 is coupled to interior surface 250 of barrel section 200, positioning member 210 is coupled to bulkhead 202, and fastener 212 is threadably engaged with positioning member 210. More specifically, in first installation position 262, fastener 212 is threadably engaged with positioning member 210 such that a first distance $D_1$ is defined between base member 208 and positioning member 210, and such that bulkhead 202 is not in a final installation position relative to barrel section 200.

Referring to FIG. 7, in second installation position 264, fastener 212 is further threadably engaged with positioning member 210 causing head portion 230 to bias, either directly or indirectly, against flange portion 220 of base member 208. Further threadably engaging fastener 212 with positioning member 210 causes positioning member 210 to translate towards base member 208. As such, a smaller second distance $D_2$ is defined between base member 208 and positioning member 210, and bulkhead 202 is in a final installation position. In one implementation, fastener 212 threadably engages positioning member 210 until rim edge 258 is forced against stopper portion 254.

Figure 8:
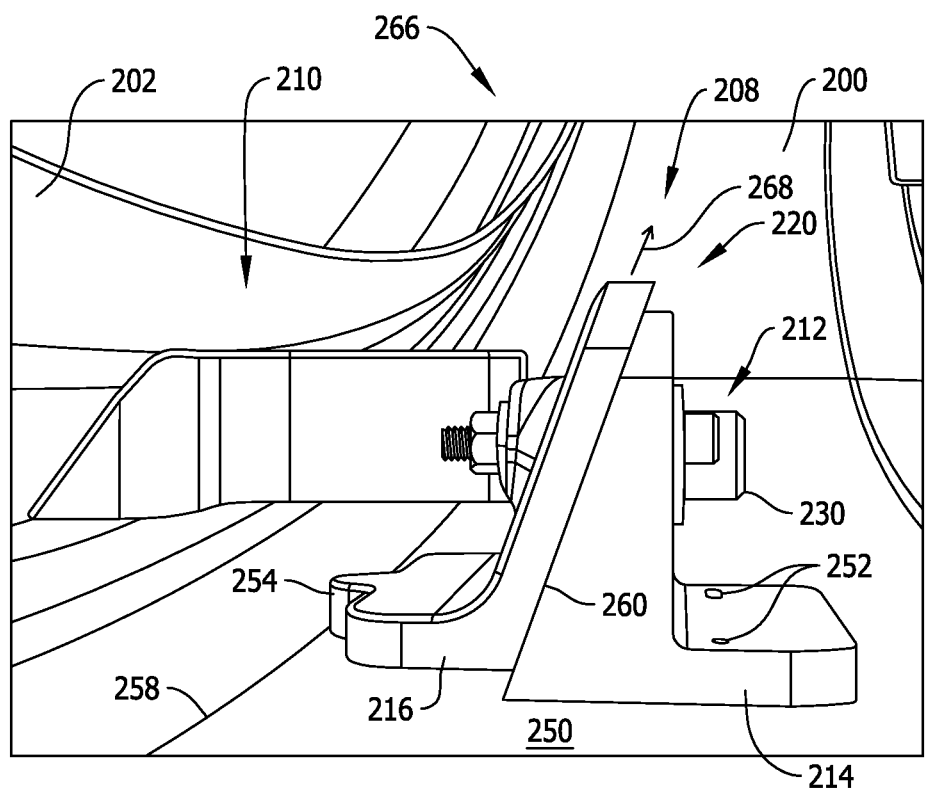
FIG. 8 is a partially transparent side view of the tool shown in FIG. 5 in a disengagement operational position.

FIG. 8 is a partially transparent side view of tool 206 in a disengagement operational position 266. As described above, secondary fastener 218 loosens to enable moveable portion 216 to selectively translate relative to stationary portion 214 without being uncoupled therefrom. More specifically, moveable portion 216 is slidably coupled with stationary portion 214 when secondary fasteners 218 are loosened. Moveable portion 216 translates in a direction 268 substantially aligned with interface 260 to uncouple moveable portion 216 from interior surface 250. In one implementation, moveable portion 216 translates in direction 268 to uncouple stopper portion 254 from rim edge 258. As such, tool 206 in disengagement operational position 266 relieves pressure induced on the temporary fasteners within temporary fastener holes 252 to facilitate uncoupling base member 208 from barrel section 200.

A method of installing bulkhead 202 within a structure is also described herein. The method includes positioning bulkhead 202 in a first installation position 262 within the structure, coupling base member 208 of tool 206 to the structure, and coupling positioning member 210 of tool 206 to bulkhead 202. Fastener 212 extends through base member 208 to engage positioning member 210, and positioning member 210 is retracted towards base member 208 such that bulkhead 202 is in second installation position 264 within the structure.

In one implementation, engaging positioning member 210 includes threadably engaging fastener 212 with screw hole 248 defined in positioning member 210, wherein a distance that positioning member 210 retracts towards base member 208 is based on a distance that fastener 212 is inserted within screw hole 248. Further, retracting positioning member 210 includes biasing fastener 212 against base member 208 to retract positioning member 210 towards base member 208. The method also includes forming a pair of fastener holes in bulkhead 202 and in the structure when bulkhead 202 is in second installation position 264. The method further includes In some implementations, the method includes uncoupling positioning member 210 from bulkhead 202 when bulkhead 202 is in second installation position 264, and retracting positioning member 210 towards base member 208 such that positioning member 210 is disengaged from bulkhead 202. The method further includes translating moveable portion 216 of base member 208 relative to stationary portion 214 of base member 208 along interface 260 defined therebetween when positioning member 210 is disengaged from bulkhead 202, wherein interface 260 is angled relative to surface 250 of barrel section 200.

The implementations described herein relate to a system and methods of installing a bulkhead within a structure. More specifically, the system includes a plurality of tools that each include a variety of components that enable each tool to pull the bulkhead towards a final installation position from within the structure. the plurality of tools may be operable either alone or in combination to pull the bulkhead towards the final installation position. As such, the bulkhead is installed within the structure in a more efficient manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A tool for use in installing a bulkhead within a structure, said tool comprising:
   a base member comprising:
      a stationary portion configured to couple to the structure; and a moveable portion coupled to said stationary portion; and a positioning member configured to couple to the bulkhead, wherein said base member comprises a primary fastener hole sized to receive at least a portion of a fastener therethrough, and sized such that said fastener is configured to bias against said base member to retract said positioning member towards said base member when the fastener is engaged with said positioning member, and wherein said primary fastener hole extends through both said stationary portion and said moveable portion.

2. The tool in accordance with claim 1,
wherein said moveable portion is selectively translateable relative to said stationary portion along an interface defined therebetween.

3. The tool in accordance with claim 2, wherein said moveable portion is coupled to said stationary portion at the interface having an angled orientation relative to a surface of the structure.

4. The tool in accordance with claim 1, wherein said stationary portion comprises a fastener slot sized to receive at least one secondary fastener therethrough, said fastener slot having an elongated shape such that said at least one secondary fastener is selectively translatable therein.

5. The tool in accordance with claim 1, wherein said fastener is configured to threadably engage a screw hole defined in said positioning member, such that a distance that said positioning member retracts towards said base member is based on a distance that said fastener is inserted within said screw hole.

6. The tool in accordance with claim 5, wherein said positioning member comprises:
a lateral portion configured to couple to the bulkhead; and
an elongated portion extending from said lateral portion, wherein said screw hole is defined in said elongated portion such that said elongated portion and said fastener are substantially coaxially aligned when said fastener is threadably engaged with said screw hole.

7. The tool in accordance with claim 1, wherein said base member comprises a flange portion extending in a substantially normal direction from a surface of the structure, said primary fastener hole defined in said flange portion.

8. The tool in accordance with claim 7, wherein said fastener comprises a threaded portion and a head portion coupled to said threaded portion, said threaded portion sized to extend through said primary fastener hole from a first side to a second side of said flange portion, and said head portion sized such that said head portion is configured to bias against the first side of said flange portion.

9. The tool in accordance with claim 1, wherein said base member comprises a stopper portion oriented to extend towards the bulkhead when said base member is coupled to the structure.

10. A system for use in installing a bulkhead within a barrel section of an aircraft, said system comprising:
a plurality of tools positioned circumferentially about the barrel section of the aircraft, wherein each tool comprises:
a base member comprising:
a stationary portion coupled to the barrel section of the aircraft; and
a moveable portion coupled to said stationary portion;
a positioning member coupled to the bulkhead; and
a fastener extending through both said stationary portion and said moveable portion to selectively engage said positioning member, wherein said fastener is configured to bias against said base member to retract said positioning member towards said base member.

11. The system in accordance with claim 10, wherein said moveable portion is coupled to said stationary portion with at least one secondary fastener, wherein said moveable portion is selectively translatable relative to said stationary portion along an interface defined therebetween.

12. The system in accordance with claim 10, wherein said base member comprises a flange portion extending in a substantially normal direction from a surface of the structure, wherein a primary fastener hole defined in said flange portion receives at least a portion of said fastener therethrough.

13. The system in accordance with claim 10, wherein said fastener threadably engages a screw hole defined in said positioning member, such that a distance that said positioning member retracts towards said base member is based on a distance that said fastener is inserted within said screw hole.

14. A method of installing a bulkhead within a structure, said method comprising:
positioning the bulkhead in a first installation position within the structure;
coupling a base member of a tool to the structure, wherein the base member includes a stationary portion coupled to the structure and a moveable portion coupled to the stationary portion;
coupling a positioning member of the tool to the bulkhead;
extending a fastener through both the stationary portion and the moveable portion to engage the positioning member, wherein the fastener biases against the base member; and
retracting the positioning member towards the base member such that the bulkhead is in a second installation position within the structure.

15. The method in accordance with claim 14, wherein retracting the positioning member comprises biasing the fastener against the base member to retract the positioning member towards the base member.

16. The method in accordance with claim 14 further comprising forming a pair of fastener holes in the bulkhead and in the structure when the bulkhead is in the second installation position.

17. The method in accordance with claim 14 further comprising threadably engaging the fastener with a screw hole defined in the positioning member, wherein a distance that the positioning member retracts towards the base member is based on a distance that the fastener is inserted within the screw hole.

18. The method in accordance with claim 14 further comprising:
uncoupling the positioning member from the bulkhead when the bulkhead is in the second installation position; and
retracting the positioning member towards the base member such that the positioning member is disengaged from the bulkhead.

19. The method in accordance with claim 18 further comprising translating a moveable portion of the base member relative to a stationary portion of the base member along an interface defined therebetween when the positioning member is disengaged from the bulkhead, wherein the interface is angled relative to a surface of the barrel section.

20. The tool in accordance with claim 1, wherein said fastener is directly coupled to and extends between said base member and said positioning member.

* * * * *